(12) United States Patent
Wang et al.

(10) Patent No.: US 10,459,146 B2
(45) Date of Patent: Oct. 29, 2019

(54) DISPLAY DEVICE WITH BACKLIGHT MODULE AND METHOD FOR MANUFACTURING THE SAME

(71) Applicant: InnoLux Corporation, Miao-Li County (TW)

(72) Inventors: Hui-Chi Wang, Miao-Li County (TW); Yen-Liang Chen, Miao-Li County (TW); Fang-Ho Lin, Miao-Li County (TW); Chin-Lung Ting, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 55 days.

(21) Appl. No.: 15/615,898

(22) Filed: Jun. 7, 2017

(65) Prior Publication Data
US 2018/0011353 A1    Jan. 11, 2018

(30) Foreign Application Priority Data

Jun. 13, 2016  (CN) .......................... 2016 1 0411432
Jun. 1, 2017   (CN) .......................... 2017 1 0404081

(51) Int. Cl.
*F21V 8/00*   (2006.01)
*G02B 6/00*   (2006.01)
*G02F 1/1333* (2006.01)

(52) U.S. Cl.
CPC ............. *G02B 6/0031* (2013.01); *G02B 6/00* (2013.01); *G02B 6/005* (2013.01); *G02B 6/0025* (2013.01);

(Continued)

(58) Field of Classification Search
CPC .. G02B 6/0053; G02B 6/0001; G02B 6/0055; G02B 6/4298; G02B 6/0031; G02B 6/0051; G02B 6/0016; G02B 6/002; G02B 6/0021; G02B 6/0025; G02B 6/0043; G02B 6/00; G02B 6/0033; G02B 6/005; G02B 6/0088; G02F 1/1336; G02F 1/133615; G02F 1/133308; G02F 2001/133616; H01L 33/46; H01L 33/22; H01L 33/60
See application file for complete search history.

(56) References Cited

U.S. PATENT DOCUMENTS 10,126,484  B2 * 11/2018 Jeon ..................... G02B 6/0031
2008/0225506 A1 *  9/2008 Huang ................. G02B 6/0056
                                                       362/19
(Continued)

*Primary Examiner* — Huyen L Ngo
(74) *Attorney, Agent, or Firm* — Bacon & Thomas, PLLC

(57) ABSTRACT

A display device and a method for manufacturing the same are disclosed. The display device includes a backlight module, a display panel, and a decorative film. The backlight module includes: a reflective layer disposed on the decorative film; a light guide plate disposed on the reflective layer, a set of optical films including a first diffusion layer, and at least one refractive layer. The light guide plate has a first surface facing the reflective layer and a second surface opposite to the first surface, and the first diffusion layer is disposed on the second surface. At least one refractive layer is disposed on at least one of the first surface and the second surface, wherein a refractive index of the refractive layer is between 1.15 and 1.45. The display panel is disposed on one side of the set of optical films far away from the light guide plate.

20 Claims, 13 Drawing Sheets

(52) U.S. Cl.
CPC ......... *G02B 6/0055* (2013.01); *G02B 6/0065* (2013.01); *G02F 1/133308* (2013.01); *G02F 2001/133314* (2013.01)

(56) References Cited

U.S. PATENT DOCUMENTS

| | | | |
|---|---|---|---|
| 2010/0142222 A1* | 6/2010 | Vahabzadeh | G02B 6/0043 362/615 |
| 2012/0268687 A1* | 10/2012 | Kaida | B29D 11/00663 349/61 |
| 2017/0031205 A1* | 2/2017 | Lee | G02F 1/133502 |
| 2017/0059762 A1* | 3/2017 | Park | G02B 6/005 |
| 2017/0068287 A1* | 3/2017 | Jung | G06F 1/1686 |
| 2018/0067253 A1* | 3/2018 | Ting | G02B 6/00 |

* cited by examiner adhering a decorative film and a reflective layer, and adhering a light guide plate and the reflective layer, wherein the light guide plate has a first surface and a second surface opposite to the first surface, the first surface faces the reflective layer, at least one refractive layer is disposed on at least one of the first surface and the second surface, and the refractive layer has a refractive index between 1.15 and 1.45 ~(A)

disposing a light source and a printed circuit board besides the light guide plate ~(B)

adhering a set of optical films and the light guide plate, wherein the set of optical films comprises a first diffusion layer, and the first diffusion layer is disposed on the second surface of the light guide plate ~(C)

assembling the reflective layer, the light guide plate, the refractive layer and the set of optical film, and disposing a display panel on one side of the set of optical films far away from the light guide plate, to form a display device ~(D)

FIG. 7

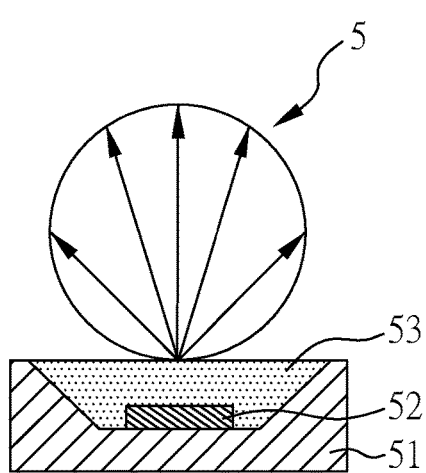
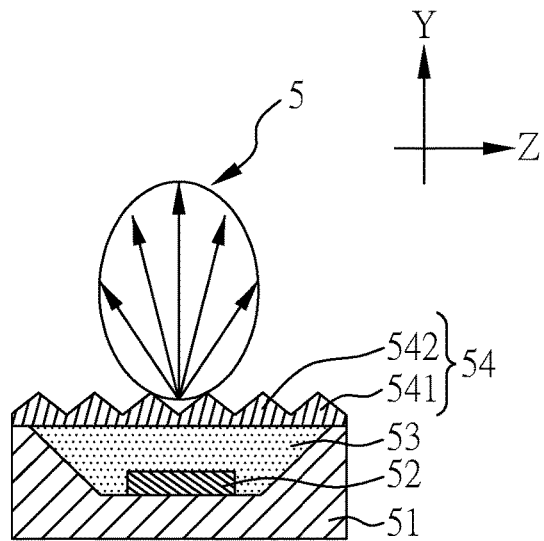
FIG.8A  FIG. 8B
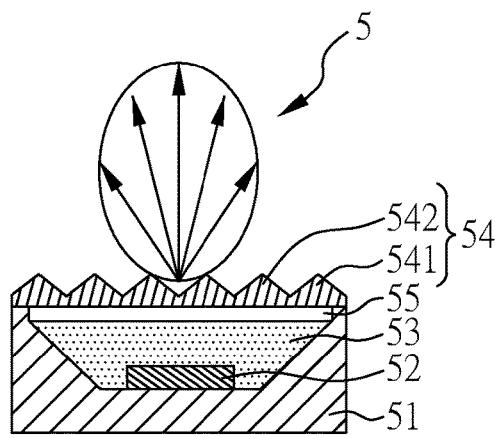
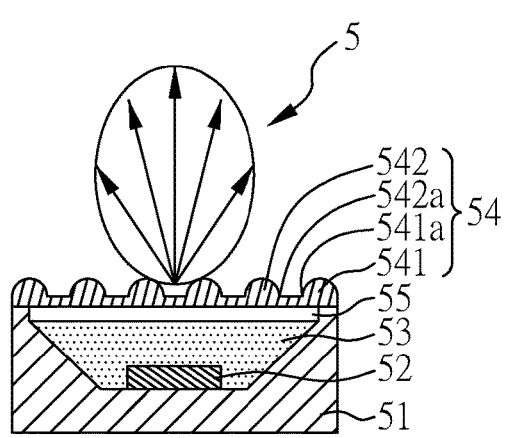
FIG. 8C  FIG. 8D

DISPLAY DEVICE WITH BACKLIGHT MODULE AND METHOD FOR MANUFACTURING THE SAME

CROSS REFERENCE TO RELATED APPLICATION

This application also claims the benefits of the Chinese Patent Application Serial Numbers 201610411432.0 and 201710404081.5, respectively filed on Jun. 13, 2016 and Jun. 1, 2017, the subject matter of which is incorporated herein by reference.

BACKGROUND

1. Field

The present disclosure relates to a display device and a method for manufacturing the same, and more particularly to a method for manufacturing a display device by adhering its light guide plate to a reflective layer or a set of optical films.

2. Description of Related Art

Liquid crystal display devices (LCD devices) are popular flat panel displays. The liquid crystal display devices have many advantages such as high luminance, light weight, or low power consumption, or have been extensively used as displays of various household appliances, mobile phones, or laptop computers. With the increasing applications of the liquid crystal display devices, consumers require higher display quality of the liquid crystal display devices, and thus related manufacturers are paying efforts to develop displays for light weight or better display quality.

Generally, a liquid crystal display device comprises a liquid crystal panel, a backlight module, and a frame for fixing the liquid crystal panel and the backlight module. In the backlight module, its backplane, frame, and reflective layer are usually three separated components, and thus need more processes to assemble. Consequently, the assembled products tend to have warping, waving, or foreign material defects, and lead to backlight nonuniformity, or inferior display quality.

Moreover, the backplane of the backlight module is typically made of metal materials, and the backplane of the backlight module is heavy, thick, or costly, which is difficult for reducing weight, or manufacturing costs.

In view of this, even if the present display device products have become mature and predominant, the display quality of the display devices needs to be satisfied.

SUMMARY

In one embodiment, the present disclosure provides a display device and a method for manufacturing the same. In a display device according to one embodiment of the present disclosure, a light guide plate is adhered to a reflective layer, and/or the light guide plate is adhered to a set of optical films.

In one embodiment of the present disclosure, a display device comprises a decorative film, a backlight module, and a display panel. The backlight module comprises a reflective layer disposed on the decorative film, a light guide plate disposed on the reflective layer, wherein the light guide plate has a first surface and a second surface opposite to the first surface, and the first surface faces the reflective layer; a set of optical films comprising a first diffusion layer, wherein the first diffusion layer is disposed on the second surface of the light guide plate; and at least one refractive layer disposed on at least one of the first surface and the second surface of the light guide plate, wherein the refractive layer has a refractive index between 1.15 and 1.45.

In one embodiment of the present disclosure, a display device comprises a decorative film, a backlight module, and a display panel. The backlight module comprises a reflective layer disposed on the decorative film a light guide plate disposed on the reflective layer, wherein the light guide plate has a first surface and a second surface opposite to the first surface, and the first surface faces the reflective layer, a set of optical films comprising a first diffusion layer, wherein the first diffusion layer is disposed on the second surface of the light guide plate; and at least one refractive layer directly contacts at least one of the first surface and the second surface of the light guide plate, wherein the refractive layer has a refractive index between 1.15 and 1.45.

In one embodiment, the present disclosure further provides a method for manufacturing a display device, which comprises the following steps:

(A) adhering a decorative film and a reflective layer, and adhering a light guide plate and the reflective layer, wherein the light guide plate has a first surface and a second surface opposite to the first surface, the first surface faces the reflective layer, at least one refractive layer is disposed at least one of the first surface and the second surface, and the refractive layer has a refractive index between 1.15 and 1.45;

(B) disposing a light source and a print circuit board beside the light guide plate;

(C) adhering a set of optical films and the light guide plate, wherein the set of optical films comprises a first diffusion layer, and the first diffusion layer is disposed on the second surface of the light guide plate; and (D) assembling the reflective layer, the light guide plate, the refractive layer and the set of optical films, and disposing a display panel on one side of the set of optical films far away from the light guide plate, to form a display device.

In one embodiment of the present disclosure, the light guide plate of display device is disposed on or adhered to the reflective layer and/or the light guide plate is disposed on or adhered to the set of optical films, so as to prevent warping and waving during assembling processes of the films, and in turn reduce the risk of ambient water invasion or foreign material defects. Additionally, by using the adhered combination of the decorative film and the reflective layer instead of a backplane, or forming the films through coating, the resulting display device can be further thinned. Other objects, advantages, and novel features of the disclosure will become more apparent from the following detailed description when taken in conjunction with the accompanying drawings.

BRIEF DESCRIPTION OF THE DRAWINGS

FIG. 7 is a flowchart of assembling a display device according to one exemplificative embodiment of the present disclosure.

FIG. 8A through FIG. 8D depict the structures of light sources used in display devices according to different exemplificative embodiments of the present disclosure.

DETAILED DESCRIPTION OF EMBODIMENT

Hereinafter, the present disclosure will be described with reference to some embodiments and it is understood that the embodiments are not intended to limit the scope of the present disclosure. Moreover, as the contents disclosed herein should be readily understood and can be implemented by a person skilled in the art, all equivalent changes or modifications which do not depart from the concept of the present disclosure should be encompassed by the appended claims.

In the following description, the terms like "first" and "second" are used for conveniently explanation of arrangement of, configuration of or relative relations among components, without intention to limit these components in terms of number, order, application, or implementation.

In addition, in the following embodiments of the present disclosure, the size, the thickness and the ratio of each components in the figure are intended to make a person skilled in the art understand the advantages and the effects of the present disclosure, and are not used to limit the present disclosure.

Figure 1:
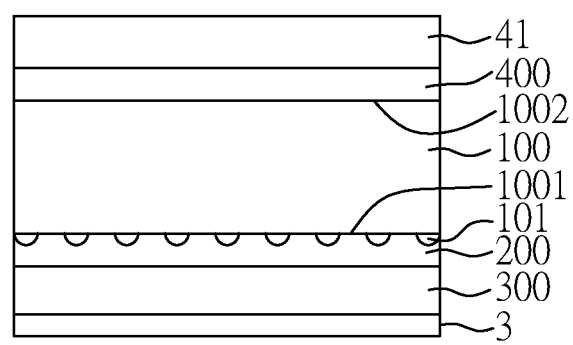
FIG. 1 is a perspective view showing the structure of a backlight module, and a decorative view according to one exemplificative embodiment of the present disclosure.

FIG. 1 is a perspective view showing the structure of a backlight module and a decorative view according to one exemplificative embodiment of the present disclosure. The display device of the present embodiment comprises: a decorative film 3; and a backlight module. The backlight module comprises: a reflective layer 300, disposed on the decorative film 3; a light guide plate 100, disposed on the reflective layer 300, wherein the light guide plate 100 has a first surface 1001 and a second surface 1002 opposite to the first surface 1001, and the first surface 1001 faces the reflective layer 300; a set of optical films, comprising a first diffusion layer 41, wherein the first diffusion layer 41 is disposed on the second surface 1002 of the light guide plate 100; and at least one of a refractive layer 200 and a refractive layer 400 disposed on at least one of the first surface 1001 and the second surface 1002 of the light guide plate 100, wherein the refractive layer 200 or the refractive layer 400 has a refractive index between 1.15 and 1.45.

Even though the aspect that the refractive layers 200 and the refractive layer 400 are simultaneously disposed on the first surface 1001 and the second surface 1002 of the light guide plate 100 is shown in FIG. 1, the present disclosure is not limited thereto. Although FIG. 1 does not shown all possible aspects of the present disclosure, the previous phrase saying "at least one of a refractive layer 200 and a refractive layer 400 disposed on at least one of the first surface 1001 and the second surface 1002 of the light guide plate 100" refers that when the first surface 1001 of the light guide plate 100 faces the reflective layer 300, the refractive layer 200 may be disposed on the first surface 1001 of the light guide plate 100, the refractive layer 400 may be disposed on the second surface 1002 of the light guide plate 100, or both of the refractive layer 200 and the refractive layer 400 may be disposed on both of the first surface 1001 and the second surface 1002 of the light guide plate 100.

Hereinafter, some different structures of light guide plate 100 and the refractive layer 200 (or the refractive layer 400) in the different embodiments and methods for preparing the same are illustrated with FIG. 2A through FIG. 2C or FIG. 3A through FIG. 3C. For example, the refractive layer 200 disposed below the first surface 1001 of the light guide plate 100 or the refractive layer 400 disposed above the second surface 1002.

Figure 2A:
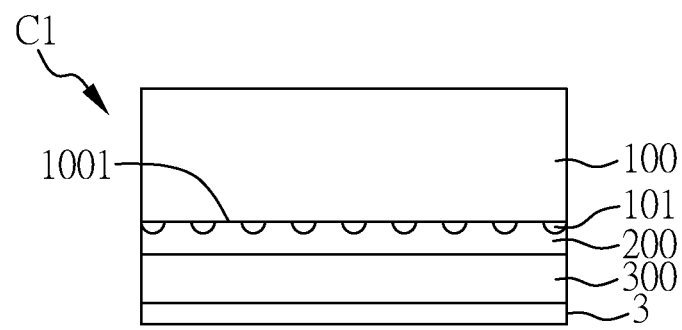
FIG. 2A through FIG. 2C are perspective view showing the structure of a light guide plate and components below a first surface thereof according to different aspects of one exemplificative embodiment of the present disclosure.
Figure 2B:
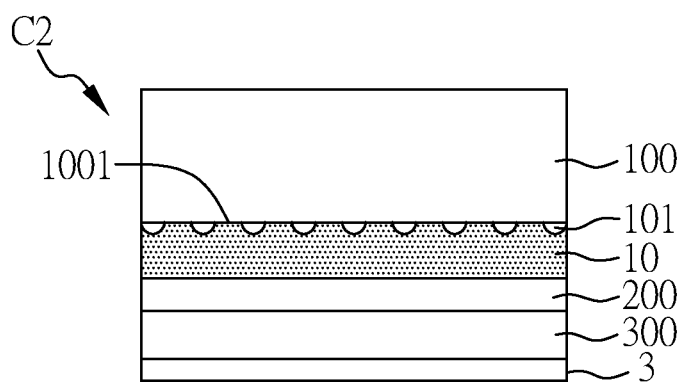
Figure 2C:
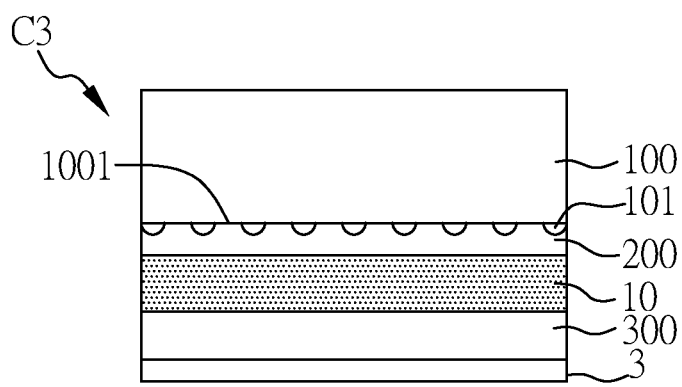

FIG. 2A through FIG. 2C are perspective view showing the structure of a light guide plate and components below a first surface thereof according to different aspects of one exemplificative embodiment of the present disclosure. In FIG. 2A, the structure C1 of a backlight module is partially depicted, which is the structure comprising the light guide plate 100 and the component below the first surface 1001 of the light guide plate 100, had shown in FIG. 1. The structure C1 comprises a light guide plate 100, a refractive layer 200, a reflective layer 300, and a decorative film 3. Therein, the light guide plate 100 has a first surface 1001 at one side, which is close to reflective layer 300. The first surface 1001 of the light guide plate 100 is provided with screen dots 101. The reflective layer 300 is disposed on the decorative film 3, the light guide plate 100 is disposed on the reflective layer 300, and the refractive layer 200 is disposed below the first surface 1001 and between the light guide plate 100 and the reflective layer 300. In FIG. 2A, the decorative film 3 and the reflective layer 300 are adhered to each other, and the refractive layer 200 also can adhere to the reflective layer 300 and the light guide plate 100 adjacent thereto because the refractive layer 200 is a pressure-sensitive adhesive layer made of pressure-sensitive adhesive, In other words, the light guide plate 100, the refractive layer 200, the reflective layer 300, and the decorative film 3 are adhered. In the present embodiment, the refractive layer 200 has a refractive index between 1.15 and 1.45, and a thickness of 0.01 μm to 200 μm. In addition, the decorative film 3 has a thickness between 1 μm and 500 μm.

The light guide plate 100 in the disclosed display device may be a polymethyl methacrylate light guide plate (PMMA light guide plate, having a refractive index about 1.49), a cyclo-olefin polymer light guide plate (COP light guide plate, having a refractive index about 1.53), a polycarbonate light guide plate (PC light guide plate, having a refractive index about 1.58), a polystyrene light guide plate (PS light guide plate, having a refractive index about 1.6), a methacrylate-butadiene-styrene copolymer light guide plate (MS light guide plate, having a refractive index about 1.53), or a glass light guide plate (having a refractive index about 1.50), but the present disclosure is not limited thereto.

Additionally, the refractive layer 200 can be a low-refractive-index layer, and the refractive index ranges between 1.15 and 1.45, or between 1.20 and 1.30. When the display device comprises plural refractive layers, these refractive layers may be made of identical or different materials as long as the refractive index of these refractive layers is in the range between 1.15 and 1.45. However, the present disclosure is not limited thereto. The refractive layer of the present disclosure can be formed by adhering method or other method such as a coating method, but the present disclosure is not limited thereto. In one embodiment of the present disclosure, the thickness of the refractive layer can be between 0.01 µm to 200 µm. In another embodiment of the present disclosure, the thickness of the refractive layer can be between 10 µm to 200 µm. In further another embodiment of the present disclosure, the thickness of the refractive layer can be between 0.01 µm to 50 µm. However, the present disclosure is not limited thereto. When the thickness of the refractive layer is between 0.01 µm to 50 µm, the display device of the present disclosure can further be thinner. When the thickness of the refractive layer is between 10 µm to 200 µm, the display device of the present disclosure can have better strength.

In other embodiments of the present disclosure, the refractive layer 200 may be adhesive itself and adheres to layers adjacent thereto. Alternatively, when the refractive layer 200 is not adhesive, the refractive layer can be adhered to layers adjacent thereto through additional adhesive layer 10. As another alternative, the refractive layer is formed by a coating method, which is tightly bound to layers adjacent thereto through a spreading and curing process.

For example, to form a refractive layer 200 between a reflective layer 300 and a light guide plate 100, the refractive layer 200 can be disposed below the first surface 1001 of the light guide plate 100 through the following manners. When the refractive layer 200 is adhesive itself, the refractive layer 200 is directly adhere to the reflective layer 300 and the light guide plate 100 respectively, as shown in FIG. 2A. Alternatively, a refractive layer 200 is formed using a coating method on the first surface 1001 of the light guide plate 100, and the refractive layer 200 is bound tightly to the light guide plate 100, and then the refractive layer 200 is adhered to the reflective layer 300 by a first adhesive layer 10, as shown in FIG. 2C. As another alternative, a refractive layer 200 is formed using a coating method on the reflective layer 300, and the refractive layer 200 is bound tightly to the reflective layer 300, and then the refractive layer 200 is adhered to the light guide plate 100 by a first adhesive layer 10, as shown in FIG. 2B. As a further alternative, a refractive layer 200 is formed using a coating method on the first surface 1001 of the light guide plate 100, and then a reflective layer 300 is formed using a coating method on the refractive layer 200, as shown in FIG. 2A. However, the present disclosure is not limited thereto.

FIGS. 2B and 2C are based on different aspects of the refractive layer 200 that is not adhesive itself. In the embodiments of the present disclosure, when the refractive layer 200 is disposed on the first surface 1001 of the light guide plate 100, the display device further comprises a first adhesive layer 10. The first adhesive layer 10 may be sandwiched between the refractive layer 200 and the light guide plate 100 (as shown in FIG. 2B), or between the refractive layer 200 and the reflective layer 300 (as shown in FIG. 2C). In addition, a refractive index of the first adhesive layer 10 may be greater than the refractive index of the refractive layer 200.

FIG. 2B shows the structure C2 of a backlight module, and the structure C2 of FIG. 2B is similar to the structure C1 of FIG. 2A. In the aspect of FIG. 2B, a refractive layer 200 having a thickness of 0.01 µm to 10 µm is formed using a coating method on the reflective layer 300, the refractive layer 200 is bound tightly to the reflective layer 300, and then refractive layer 200 is adhered to the first surface 1001 of the light guide plate 100 by the first adhesive layer 10, and the light guide plate 100 has the screen dots 101. The first adhesive layer 10 has a thickness about between 1 µm and 200 µm. FIG. 2C shows the structure C3 of a backlight module, and the structure C3 of FIG. 2C is similar to the structure C1 of FIG. 2A. In the aspect of FIG. 2C, a refractive layer 200 having a thickness of 0.01 µm to 10 µm is formed using a coating method on the first surface 1001 of the light guide plate 100, the light guide plate 100 has the screen dots 101, the refractive layer 200 is bound tightly to the light guide plate 100 and directly contacts the first surface 1001 of the light guide plate 100, and the refractive layer 200 is adhered to the reflective layer 300 by the first adhesive layer 10. The first adhesive layer 10 has a thickness about 1 µm to 200 µm. In the aspects shown in FIG. 2B and FIG. 2C, the decorative film 3 and the reflective layer 300 are adhered to each other, and the decorative film 3 has a thickness between 1 µm and 500 µm, while the refractive layer 200 has a refractive index between 1.15 and 1.45, or between 1.2 and 1.3. For example, the refractive index of the first adhesive layer 10 is greater than or equal to 1.45. The refractive index of the first adhesive layer 10 is greater than the refractive index of the refractive layer 200. In addition, the reflective layer 300 may have a reflectivity, and the reflectivity is greater than or equal to 80%, greater than or equal to 90%, or greater than or equal to 98%. More particularly, for example, the reflective layer 300 has a reflectivity between 80% and 100%, between 90% and 100%, or between 98% and 100%.

The first adhesive layer 10 shown in FIG. 2B and FIG. 2C may be made of adhesive gel. For example, it may be a pressure-sensitive adhesive layer made of pressure-sensitive adhesive, an adhesive layer 10 made of optical adhesive or hydrogel adhesive. In one embodiment of the present disclosure, the first adhesive layer 10 may be a pressure-sensitive adhesive layer made of pressure-sensitive adhesive. In this case, with pressure applied to the pressure-sensitive adhesive, good adhesion can be achieved in a rapid and technically convenient way. Furthermore, in FIGS. 2A through 2C, the decorative film 3 and the reflective layer 300 are adhered to each other, but the present disclosure puts no limitation to how they are adhered or what they are made of. For example, the decorative film 3 and the reflective layer 300 may be adhered to each other by optical adhesive or hydrogel, or a layer with decorative effect can be coated on the reflective layer 300 to form decorative film 3. However, the present disclosure is not limited thereto. In addition, the thicknesses of the first adhesive layer, the reflective layer, and the light guide plate may be adaptive to actual use and application. The present disclosure is not limited thereto.

In one embodiment of the present disclosure, when the disclosed display device comprises plural refractive layers that are not adhesive themselves, and these refractive layers are adhered to layers adjacent thereto by adhesive layers, these adhesive layers may be made of identical or different adhesive gel materials, as long as these adhesive layers have their refractive index greater than the refractive index of the refractive layer 200. However, the present disclosure is not limited thereto.

In one embodiment of the present disclosure, when a first adhesive layer 10 is provided between the light guide plate 100 and the refractive layer 200, the first adhesive layer 10 covers screen dots 101 at one side of the light guide plate close to the reflective layer 200. In other words, the adhesive gel covers these screen dots when it is applied to form the first adhesive layer. The present disclosure puts no limitation to how the screen dots 101 are generated.

In one embodiment of the present disclosure, since the display device does not have a backplane, it incorporates a decorative film 3 at one side of the reflective layer, and the decorative film 3 is adhered to the reflective layer and the bottom. According to the present disclosure, the decorative film 3 may be implemented in various aspects. For example, the decorative film may be a simple decorative film. Alternatively, a black paint is spread to the back of the reflective layer, and the reflective layer is adhered to a hard-coating film (HC/PET) by optical coating. In this case, the hard-coating film can be used as a decorative film 3. Alternatively, the decorative film 3 and a frame body can be an integrated frame. In this case, a light source, a display panel, a set of optical films, a light guide plate 100, a reflective layer and other components of the display device may be placed into the space defined by the integrated frame. In one embodiment of the present disclosure, the decorative film 3 may have a thickness between 1 micron (μm) and 500 micron (μm). In another embodiment of the present disclosure, the decorative film 3 may have a thickness between 50 micron (μm) and 500 micron (μm). In further another embodiment of the present disclosure, the decorative film 3 may have a thickness between 1 micron (μm) and 100 micron (μm). However, the present disclosure is not limited thereto. When the decorative film has a thickness between 1 micron (μm) and 100 micron (μm), the display device of the present disclosure can further be thinner. When the decorative film 3 has a thickness between 50 micron (μm) and 500 micron (μm), the display device of the present disclosure has better strength. In addition, the decorative film 3 may be adhered to the reflective layer, or disposed on the reflective layer by other manners (for example, a coating method). The present disclosure puts no limitation to aspects of the decorative film 3.

Figure 2D:
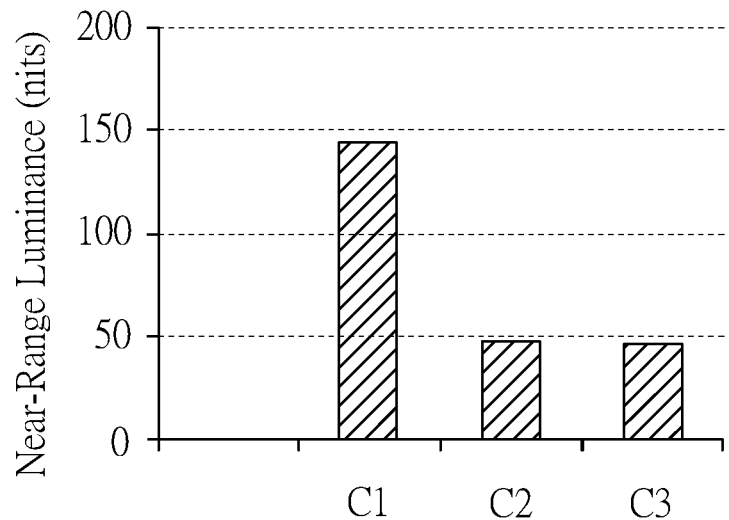
FIG. 2D and FIG. 2E show results from luminance tests of the structures shown in FIG. 2A through FIG. 2C.
Figure 2E:
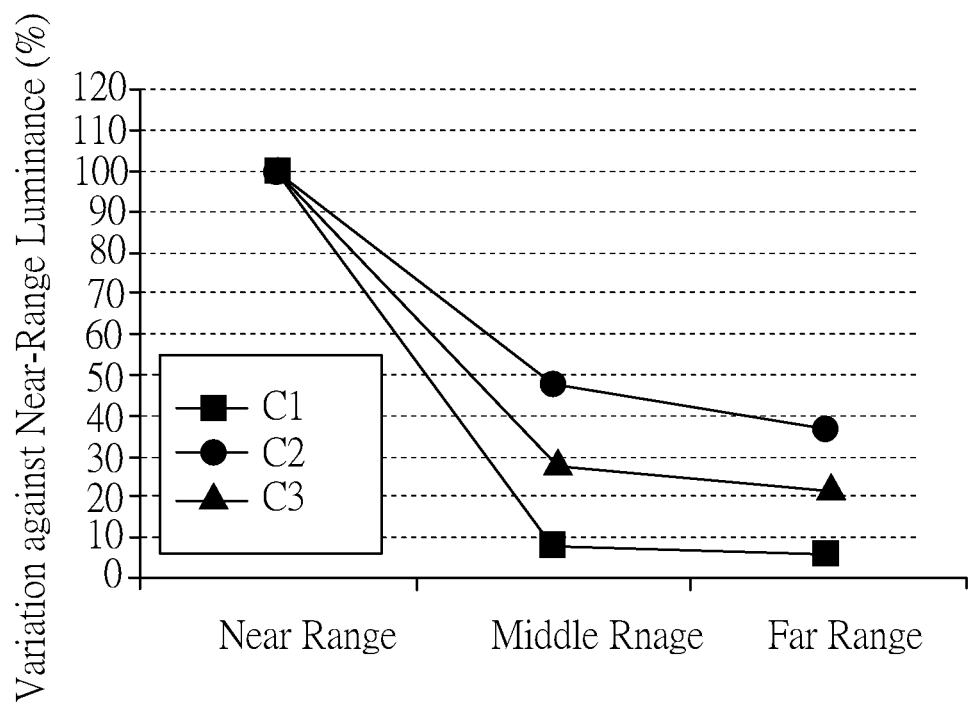

The light guide plates made according to the structures shown in FIGS. 2A, 2B, and 2C, respectively correspond to the structures C1, C2, and C3 in FIG. 2D and FIG. 2E with their luminance values from a near range, a middle range, and a far range to the luminous surfaces measured using a color analyzer in a darkroom. It is to be noted that the structure C1 is similar to what is shown in FIG. 2A, with the difference at the refractive layer 200. In particular, the refractive layer 200 of FIG. 2A has a refractive index between 1.15 and 1.45, but the refractive index of the refractive layer in the structure C1 used in the present test was designed to be about 1.48. Furthermore, both of the structures C2 and C3 had their refractive layer 200 with a refractive index about 1.29. FIG. 2D compares the luminance values (nits) of the three light guide plates measured at a site near the luminous surfaces. Herein, the light guide plate provides better the performance when the front luminance value is lower. FIG. 2E is a comparative graph, wherein each luminance value (nits) of the three light guide plates measured at the site near its luminous surface is defined as 100%, the luminance values are measured at the middle range and the far range, and these luminance values are normalized according to the luminance values measured at the near range. Herein, the light guide plate provides better performance when the decay rate of the luminance value is lower. According to FIG. 2D and FIG. 2E, it is clear to obtain that the structure C1 showed the greatest front luminance value because its high-refractive-index refractive layer 200, and it provides the less effective among the three light guide plates. On the other hand, the structures C2 and C3 made using the refractive layer 200 (having a refractive index between 1.15 and 1.45, or between 1.20 and 1.30) of the present disclosure effectively reduces the front light output after adhered, or improves decay of their luminance.

Herein, FIG. 2A is used for explanation. In one embodiment, a low-refraction paint may be directly applied to the first surface 1001 of the light guide plate 100. The low-refraction paint after cured can be directly bound tightly to the light guide plate 100, thereby forming a refractive layer 200 having a thickness of 0.01 μm to 50 μm. Then a high-reflection paint is applied to the refractive layer 200. The high-reflection paint after cured can be directly bound tightly to the refractive layer 200, thereby forming a reflective layer 300 having a thickness between 1 μm and 100 μm. Therein, the refractive index of the refractive layer 200 is between 1.15 and 1.45, or between 1.2 and 1.3. The reflective layer 200 of the present disclosure can be formed by an adhering method or other method such as a coating method, but the present disclosure is not limited thereto. In one embodiment of the present disclosure, the thickness of the reflective layer 200 may be between 1 μm and 500 μm. In another embodiment of the present disclosure, the thickness of the reflective layer 200 may be between 50 μm and 500 μm. In further another embodiment of the present disclosure, the thickness of the reflective layer may be between 1 μm and 100 μm. However, the present disclosure is not limited thereto. When the thickness of the reflective layer 200 is between 1 μm and 100 μm, the display device of the present disclosure can further be thinner. When the thickness of the reflective layer 200 is between 50 μm and 500 μm, the display device of the present disclosure can have better strength.

Figure 3A:
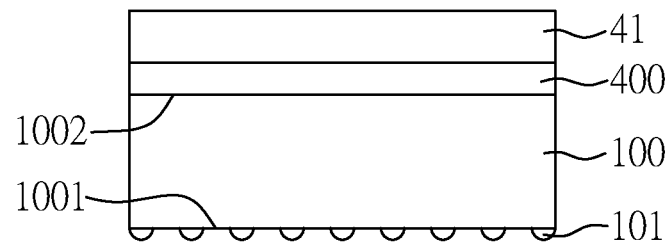
FIG. 3A through FIG. 3C are perspective view showing the structure of a light guide plate and components above a second surface thereof according to different aspects of one exemplificative embodiment of the present disclosure.
Figure 3B:
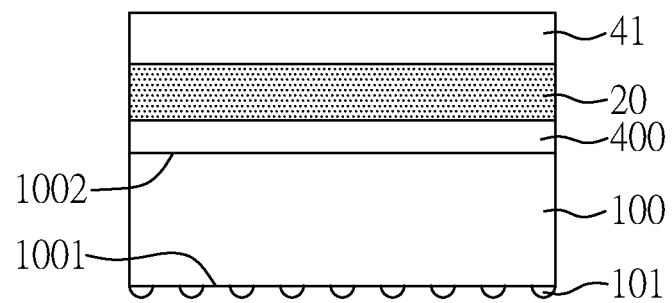
Figure 3C:
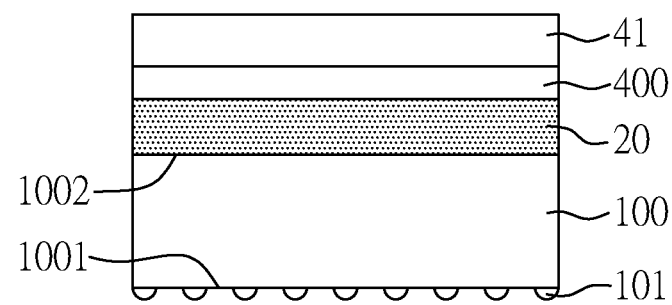

FIG. 3A through FIG. 3C are perspective view showing the structure of a light guide plate 100 and components above a second surface 1002 thereof according to different aspects of the present embodiment.

First, FIG. 3A partially shows the backlight module comprising the light guide plate 100, the refractive layer 400, and the first diffusion layer 41. The light guide plate 100 has its first surface 1001 provided with screen dots 101, and the light guide plate 100 has a second surface 1002 at one side thereof far away from first surface 1001. In FIG. 3A, the refractive layer 400 is a pressure-sensitive adhesive layer made of pressure-sensitive adhesive, so it adheres to both the first diffusion layer 41 and the light guide plate 100 adjacent thereto. In other words, the light guide plate 100, the refractive layer 400, and the first diffusion layer 41 are adhered to each other. In this case, the refractive index of the refractive layer 400 is between 1.15 and 1.45, or the refractive layer 400 has its refractive index between 1.2 and 1.3 and has its thickness of 0.01 μm to 200 μm, depending on its actual use.

To form a refractive layer 400 between a light guide plate 100 and a first diffusion layer 41, the refractive layer 400 can be, for example, disposed on the second surface 1002 of the light guide plate 100 based on the following aspects. The refractive layer 400 is adhesive itself, and directly adheres to the light guide plate 100 and the first diffusion layer 41 respectively, as shown in FIG. 3A. Alternatively, a refractive layer 400 is formed using a coating method on the second surface 1002 of the light guide plate 100, the refractive layer 400 is bound tightly to the light guide plate 100, and then the refractive layer 400 is adhered to the first diffusion layer 41 by a second adhesive layer 20, as shown in FIG. 3B. As another alternative, a refractive layer 400 is formed using a coating method on the first diffusion layer 41, the refractive layer 400 is bound tightly to the first diffusion layer 41, and then the refractive layer 400 is adhered to the light guide plate 100 by a second adhesive layer 20, as shown in FIG. 3C. As a further alternative, a refractive layer 400 is formed using a coating method on the second surface 1002 of the light guide plate 100, and a diffusion layer 41 is formed using a coating method on the refractive layer 400, as shown in FIG. 3A. However, the present disclosure is not limited thereto.

FIGS. 3B and 3C show aspects where the refractive layer 400 is not adhesive itself. In one embodiment of the present disclosure, when the refractive layer 400 is disposed on the second surface 1002 of the light guide plate 100, and the display device further comprises a second adhesive layer 20; wherein the second adhesive layer 20 may be sandwiched between the first diffusion layer 41 and the refractive layer 400 (as shown in FIG. 3B), or between the refractive layer 400 and the light guide plate 100 (as shown in FIG. 3C). In addition, a refractive index of the second adhesive layer 20 may be greater than the refractive index of the refractive layer 400.

The aspect shown in FIG. 3B is similar to that shown in FIG. 3A. In the aspect of FIG. 3B, a refractive layer 400 having a thickness of 0.01 µm to 10 µm is formed using a coating method on the second surface 1002 of the light guide plate 100, the refractive layer 400 is bound tightly to light guide plate 100 and directly contacts the second surface 1002 of the light guide plate 100, and then the refractive layer 400 is adhered to the first diffusion layer 41 by the second adhesive layer 20. The second adhesive layer 20 has a thickness about 1 µm to 200 µm. The aspect shown in FIG. 3C is similar to that shown in FIG. 3A. In the aspect of FIG. 3C, a refractive layer 400 having a thickness of 0.01 µm to 10 µm is formed using a coating method on the first diffusion layer 41, the refractive layer 400 is bound tightly to the first diffusion layer 41, and then the refractive layer 400 is adhered to the second surface 1002 of the light guide plate 100 by the second adhesive layer 20. The second adhesive layer 20 has a thickness about 1 µm to 200 µm. In the aspects of FIG. 3B and FIG. 3C, the refractive layer 400 has a refractive index between 1.15 and 1.45, or between 1.2 and 1.3. The second adhesive layer 20 has a refractive index greater than or equal to 1.45. Thus, the refractive index of the second adhesive layer 20 is greater than the refractive index of the refractive layer 400.

In FIG. 3A through 3C, haze of the first diffusion layer 41 may be 40% to 100%, or 80% to 100%.

Similarly, in FIG. 3A through 3C, the material of the second adhesive layer 20 can be identical or different from the material of the first adhesive layer, and the second adhesive layer 20 may be made of adhesive gel. For example, it may be a pressure-sensitive adhesive layer made of pressure-sensitive adhesive, or an adhesive layer made of hydrogel adhesive. In addition, the thicknesses of the second adhesive layer, the first diffusion layer, and the light guide plate may be adaptive to actual use and application. The present disclosure is not limited thereto.

Herein, FIG. 3A is used for explanation. In other embodiments, a low-refraction paint may be directly applied to the second surface 1002 of the light guide plate 100. The low-refraction paint, after cured, is directly bound tightly to the light guide plate 100, thereby forming a refractive layer 400 having a thickness of 0.01 µm to 50 µm. Then a high-haze paint is applied to the refractive layer 400. The high-haze paint, after cured, is directly bound tightly to the refractive layer 400, thereby forming a first diffusion layer 41 having a thickness between 1 µm and 100 µm. Therein, the refractive index of the refractive layer 400 is between 1.15 and 1.45, or between 1.2 and 1.3. The first diffusion layer of the present disclosure can be formed by an adhering method or other method such as a coating method, but the present disclosure is not limited thereto. In one embodiment of the present disclosure, the first diffusion layer may have a thickness between 1 µm and 200 µm. In another embodiment of the present disclosure, the first diffusion layer may have a thickness between 50 µm and 200 µm. In further another embodiment of the present disclosure, the first diffusion layer may have a thickness between 1 µm and 100 µm. However, the present disclosure is not limited thereto. When the first diffusion layer has a thickness between 1 µm and 100 µm, the display device of the present disclosure can further be thinner. When the diffusion layer has a thickness between 50 µm and 200 µm, the display device of the present disclosure can have better strength.

As shown in FIG. 1, in other embodiment of the present disclosure, the display device may comprise the refractive layer 200 and the refractive layers 400, each sandwiched between the light guide plate 100 and the reflective layer 300, and/or between the light guide plate 100 and the first diffusion layer 41. In addition, FIG. 2A through FIG. 2C and FIG. 3A through FIG. 3C respectively show different aspects of the components below the first surface 1001 of the light guide plate 100 and above the second surface 1002, and methods for preparing the same. In the present embodiment, the structure of the components below the first surface 1001 of the light guide plate 100 shown in FIG. 2A through FIG. 2C can be randomly combined with the structure of the components above the second surface 1002 of the light guide plate 100 shown in FIG. 3A through FIG. 3C, to obtain the structure comprising the backlight module and the decorative film 3 capable of using in the display device of the present disclosure.

Furthermore, as shown in FIG. 1, FIG. 2A through FIG. 2C and FIG. 3A through FIG. 3C, the aspects that the refractive layers 200 and the refractive layers 400 are simultaneously disposed on the first surface 1001 and the second surface 1002 of the light guide plate 100. However, the present disclosure is not limited thereto. In other embodiment of the present disclosure, only the first surface 1001 of the light guide plate 100 is provided with the refractive layer 200, or only the second surface 1002 of the light guide plate is provided with the refractive layer 400.

In one embodiment of the present disclosure, the light guide plate of the display device is adhered to the reflective layer, and/or the light guide plate 100 is adhered to the set of optical films, so as to prevent warping and waving during assembling processes of the films, and reduce the risk of ambient water invasion or foreign material defects. Additionally, by using the adhered combination of the decorative film 3 and the reflective layer instead of a backplane, or forming the films by coating, the resulting display device can be further thinned.

It is to be understood that assembling of the backlight module of the present disclosure is not limited to what is described herein, and any combinations may be implemented as needed.

Figure 4A:
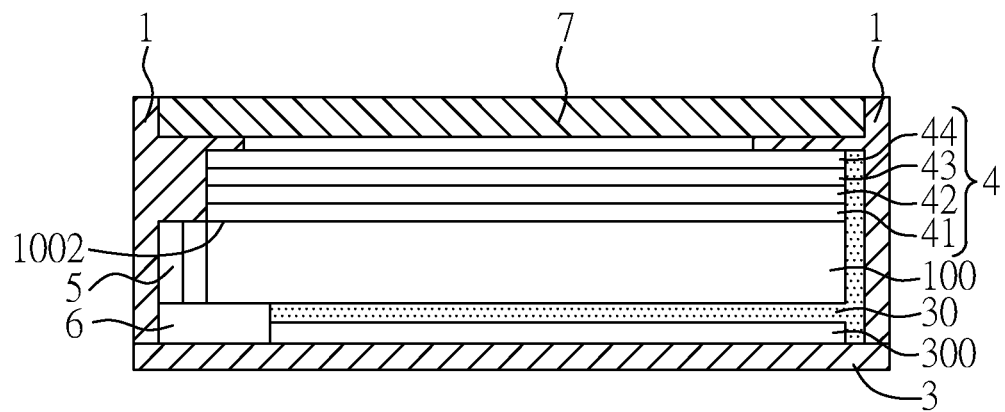
FIG. 4A depicts the structure of a display device according to one exemplificative embodiment of the present disclosure.

FIG. 4A depicts the structure of a display device according to one exemplificative embodiment of the present disclosure. Herein, the display device is assembled by a fully-adhered method. An adhesive gel 30 (e.g. optical coating) is used to binding the reflective layer 300, the decorative film 3, and the set of optical films 4 (for example, comprising the first diffusion layer 41, the first light-enhancing layer 42, the second light-enhancing layer 43, and the second diffusion layer 44) together. Then, a light source 5 (in the present embodiment, a light-emitting diode (LED)) and a printed circuit board 6 are assembled. At last, a display panel 7 is assembled with the frame 1, thereby obtaining a display device. In the present embodiment, the assembling can be accomplished by engagement, screws or adhesion, but the present is not limited thereto. In addition, the display device may further comprise a heat sink (not shown in the figure), which can be disposed besides the printed circuit board 6 or integrated with the printed circuit board 6. In the embodiment, the reflective layer 300 and the light guide plate 100 are bound using the adhesive gel 30, or the reflective layer 300 is also adhered to the decorative film 3 (not shown) by the adhesive layer made of the adhesive gel 30. Also, as shown in FIG. 4A clearly, these components and the frame 1 are also bound using the adhesive gel 30. In the present embodiment, the backlight module and the decorative film 3 can be any one illustrated in FIG. 1, FIG. 2A through FIG. 2C and FIG. 3A through FIG. 3C, and the present disclosure is not limited thereto.

In FIG. 4A, some elements of the display device are omitted. For example, the screen dots 101 on the first surface 1001 of the light guide plate 100 shown in FIG. 1 are omitted. In addition, as shown in FIG. 2A and FIG. 4A, when the refractive layer 200 has adhesive itself, the adhesive gel 30 shown in FIG. 4A can be the refractive layer 200. As shown in FIG. 2B, FIG. 2C and FIG. 4A, when the refractive layer 200 does not have adhesive, the adhesive gel 30 shown in FIG. 4A can be the first adhesive layer 10; and in this case, the refractive layer 200 is omitted in FIG. 4A. Furthermore, the refractive layer 400 and the second adhesive layer 20 shown in FIG. 3A through FIG. 3C are also omitted in FIG. 4A.

As shown in FIG. 4A, the display device of the present embodiment comprises: the decorative film 3 and the backlight module shown in FIG. 1, FIG. 2A through FIG. 2C and FIG. 3A through FIG. 3C; a display panel 7 disposed on one side of the set of optical films 4 far away from the light guide plate 100; and a frame 1, wherein the backlight module (including the light guide plate 100 and the set of optical films 4) and the display panel 7 are assembled with the frame 1. The decorative layer 3 may be contact with or not contact with the frame 1.

In the present embodiment, a set of optical films 4 is provided between the light guide plate 100 and the display panel 7. In one embodiment of the present disclosure, when a refractive layer is disposed between the light guide plate 100 and the set of optical films 4, the first diffusion layer 41 of the set of optical films 4 is adhered to the refractive layer. In addition to the binding between the first diffusion layer 41 and the refractive layer, in one embodiment of the present disclosure, optical films of the set of optical films 4 (i.e. the first diffusion layer 41, the first light-enhancing layer 42, the second light-enhancing layer 43, and/or the second diffusion layer 44) are adhered to each other by adhesive gel 30, refractive layer with adhesion (not shown). For improving optical quality, the first diffusion layer 41 and the second diffusion layer 44 may respectively have haze of 40% to 100%, 80% to 100%, or even 85% to 100%.

Figure 4B:
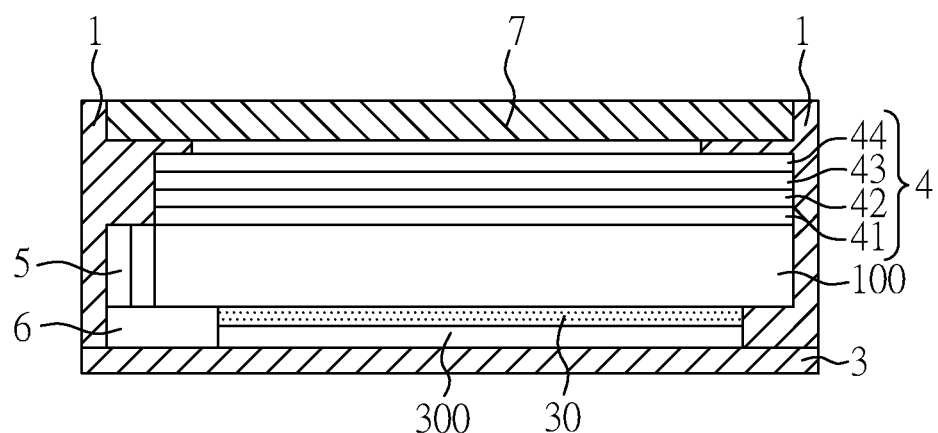
FIG. 4B depicts the structure of a display device according to another exemplificative embodiment of the present disclosure.

In another embodiment of the present disclosure, the display device is assembled by a partially-adhered method. As shown in FIG. 4B, the reflective layer 300, the light guide plate 100, and the decorative film 3 of the display device are adhered to each other by adhesive gel 30. Then the set of optical films 4 (which may comprise the first diffusion layer 41, the first light-enhancing layer 42, the second light-enhancing layer 43, and the second diffusion layer 44), a light source 5 (for example, a light emitting diode (LED)) and a printed circuit board 6 are assembled. At last, a display panel 7 is fit into the frame 1, thereby finishing the assembly. Herein, the display device may further comprise a heat sink (not shown in the figure), which can be disposed besides the printed circuit board 6 or integrated with the printed circuit board 6. In the present embodiment, the backlight module and the decorative film 3 can be any one illustrated in FIG. 1, FIG. 2A through FIG. 2C and FIG. 3A through FIG. 3C, and the present disclosure is not limited thereto.

It is to be understood that assembling of the backlight module of the present disclosure is not limited to what is shown in FIGS. 4A and 4B, and any combinations may be implemented as needed.

Since the present disclosure does not need a backplane, in FIGS. 4A and 4B, hanging holes (not shown) may be formed on the frame 1 during the process of injection molding, for the first diffusion layer 41, the first light-enhancing layer 42, the second light-enhancing layer 43, and the second diffusion layer 44 of the set of optical films 4 to hang and position.

In one embodiment of the present disclosure, the decorative film 3 has a thickness between 1 μm and 500 μm. The decorative film 3 may be implemented in various aspects according to the present disclosure. For example, the decorative film 3 may be a simple decorative film. Alternatively, a black paint is spread to the back of the reflective layer, and the reflective layer is adhered to a hard-coating film (HC/PET) by optical coating. In this case, the hard-coating film can be used as a decorative film 3. Alternatively, the decorative film 3 and a frame can be an integrated frame. In this case, a light source, a display panel, a set of optical films, a light guide plate, a reflective layer and other components of the display device may be placed into the space defined by the integrated frame. In one embodiment of the present disclosure, the decorative film 3 has a thickness between 1 μm and 500 μm. In another embodiment of the present disclosure, the decorative film 3 may have a thickness between 50 micron (μm) and 500 micron (μm). In further another embodiment of the present disclosure, the decorative film 3 may have a thickness between 1 micron (μm) and 100 micron (μm). However, the present disclosure is not limited thereto. When the decorative film 3 has a thickness between 1 micron (μm) and 100 micron (μm), the display device of the present disclosure can further be thinner. When the decorative film 3 has a thickness between 50 micron (μm) and 500 micron (μm), the display device of the present disclosure has better strength. In addition, the decorative film 3 may be adhered to the reflective layer, or disposed on the reflective layer via other manners (for example, a coating method). The present disclosure puts no limitation to aspects of the decorative film 3.

The display panel of the present disclosure may comprise, for example, liquid crystals (LCs), organic light-emitting diodes (OLEDs), quantum dots (QDs), fluorescence molecules, phosphors, light-emitting diodes (LEDs), micro light-emitting diodes (micro LEDs) or other display medium; but the present disclosure is not limited thereto. In addition, the display device of the present disclosure can be a flexible display, a touch display, or a curved display; but the present disclosure is not limited thereto.

Figure 5A:
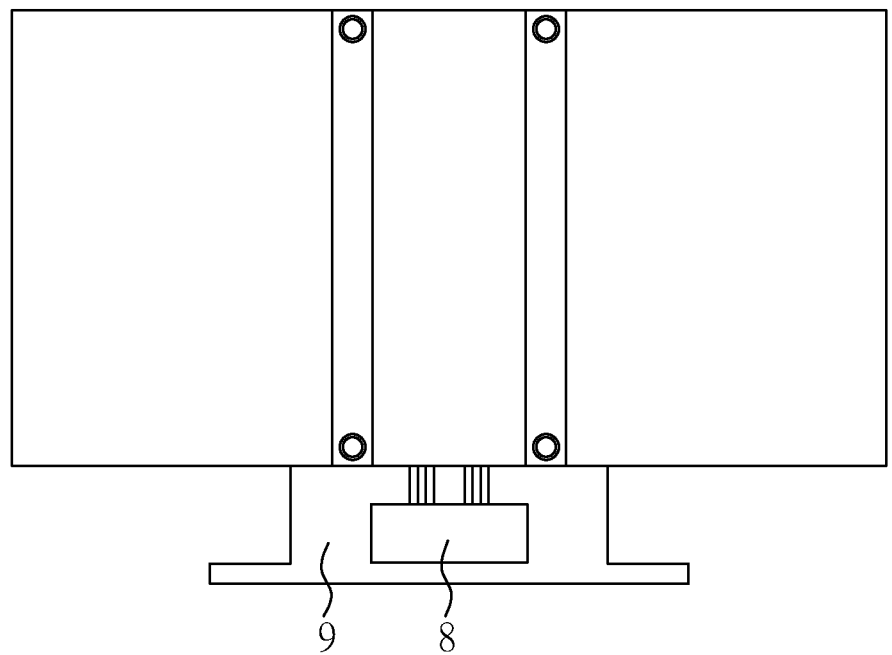
FIG. 5A depicts how a system board of a display device is fixed according to one exemplificative embodiment of the present disclosure.
Figure 5B:
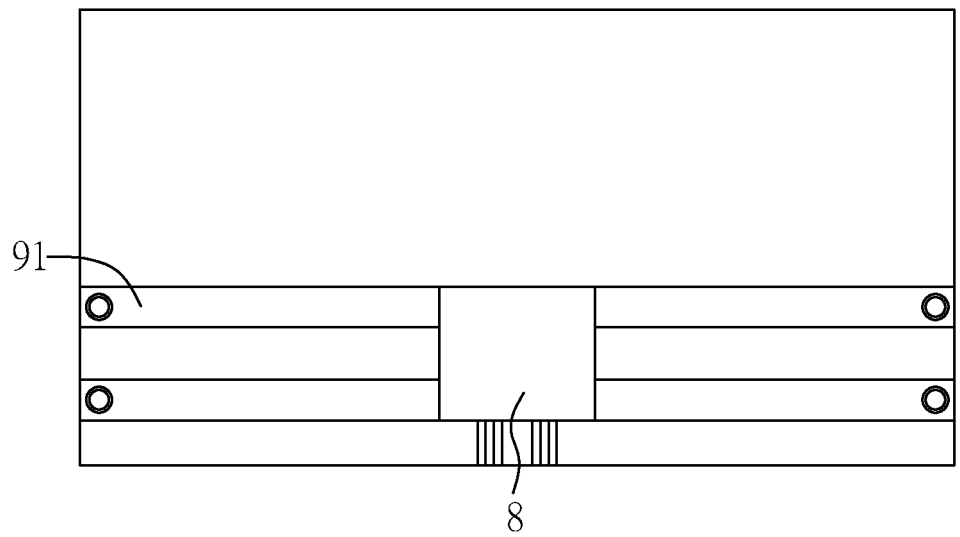
FIG. 5B depicts how a system board of a display device is fixed according to another exemplificative embodiment of the present disclosure.

Additionally, in one embodiment of the present disclosure, the display device has its reflective layer, light guide plate, and decorative film 3 adhered to each other by adhesive gel and thus eliminates the use of a backplane. Thus, in one embodiment of the present disclosure, the system board 8 may be fixed to a stand 9, as shown in FIG. 5A. Alternatively, as shown in FIG. 5B, the frame of the display device may be provided with threaded holes for stainless steel bars 91 to attach thereto. These stainless steel bars 91 not only further structurally strengthen the module, but also hold the system board 8 in position. Nevertheless, the foregoing implementation is merely illustrative, and the present disclosure is not limited thereto.

Figure 6:
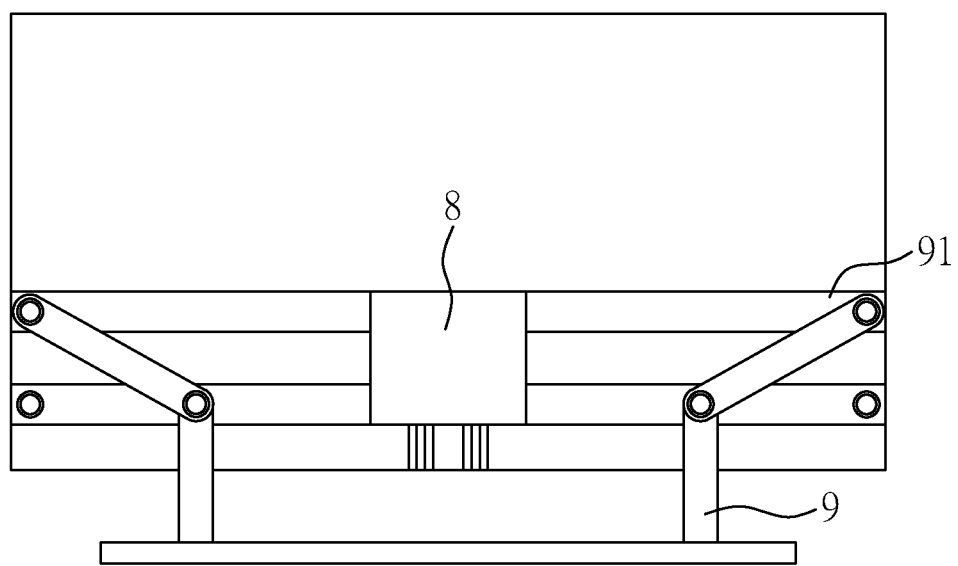
FIG. 6 depicts how a stand of a display device is fixed according to one exemplificative embodiment of the present disclosure.

Furthermore, as shown in FIG. 6, the frame of the display device may be provided with threaded holes for stainless steel bars 91 to attach thereto. These stainless steel bars 91 not only further structurally strengthen the module, but also hold the stand 9 in position. Nevertheless, the foregoing implementation is merely illustrative, and the present disclosure is not limited thereto and can be combined randomly according to actual use and application.

From the description above it is clear that the present disclosure provides a method for manufacturing the display device. As shown in FIG. 7, the light guide plate, the reflective layer, or the decorative film 3 are adhered to each other by a refractive layer or adhesive gel (e.g. optical coating). Afterward, the set of optical films is assembled (wherein a refractive layer or optical coating may be optionally used between the optical films, and between the set of optical films and the light guide plate to make them adhered to each other). Subsequently, the light source and the frame are assembled. At last, the display panel is finished by attaching the front frame thereto. Therein, the system board may be mounted on the frame, and the system board or the stand may be supported by stainless steel bars.

More specifically, as shown in FIG. 7, the present disclosure further provides a method for manufacturing a display device, which may comprise the following steps:

(A) adhering a decorative film 3 and a reflective layer 300, and adhering a light guide plate 100 and the reflective layer 300, wherein the light guide plate 100 has a first surface 1001 and a second surface 1002 opposite to the first surface 1001, the first surface 1001 faces the reflective layer 300, at least one of the refractive layer 200 and the refractive layer 400 is disposed on at least one of the first surface 1001 and the second surface 1002, and the refractive layer 200 or the refractive layer 400 has a refractive index between 1.15 and 1.45, as shown in FIG. 1;

(B) disposing a light source 5 and a printed circuit board 6 besides the light guide plate 100, as shown in FIG. 4A;

(C) adhering a set of optical films 4 and the light guide plate 100, wherein the set of optical films 4 comprises a first diffusion layer 41, and the first diffusion layer 41 is disposed on the second surface 1002 of the light guide plate 100, as shown in FIG. 4A; and (D) assembling the reflective layer 300, the light guide plate 100, the refractive layer 200 (or the refractive layer 400) and the set of optical film 4, and disposing a display panel 7 on one side of the set of optical films 4 far away from the light guide plate 100, to form a display device, as shown in FIG. 1 and FIG. 4A.

In the present disclosure, Step (A) through Step (D) can be sequentially or not sequentially performed, according to the design requirements. The present disclosure is not limited thereto.

In one aspect of the present disclosure, as shown in FIG. 2B, FIG. 2C and FIG. 7, when the refractive layer 200 is disposed on the first surface 1001 of the light guide plate 100 in Step (A), the method further comprises a step: forming a first adhesive layer 10, wherein the first adhesive layer 10 is sandwiched between the refractive layer 200 and the light guide plate 100, or between the refractive layer 200 and the reflective layer 300, and a refractive index of the first adhesive layer 10 may be greater than the refractive index of the refractive layer 200. Herein, the material and the property of the first adhesive layer 10 are illustrated before, and are not repeated again.

More specifically, as shown in FIG. 2A through FIG. 2C and FIG. 7, in Step (A), to set the refractive layer 200 between the reflective layer 300 and the light guide plate 100, the refractive layer 200 can be disposed on the first surface 1001 of the light guide plate 100 through the following manners. When the refractive layer 200 is adhesive itself, the refractive layer 200 is directly adhere to the reflective layer 300 and the light guide plate 100 respectively, as shown in FIG. 2A. Alternatively, a refractive layer 200 is formed using a coating method on the first surface 1001 of the light guide plate 100, and the refractive layer 200 is bound tightly to the light guide plate 100, and then the refractive layer 200 is adhered to the reflective layer 300 by a first adhesive layer 10, as shown in FIG. 2C. As another alternative, a refractive layer 200 is formed using a coating method on the reflective layer 300, and the refractive layer 200 is bound tightly to the reflective layer 300, and then the refractive layer 200 is adhered to the light guide plate 100 by a first adhesive layer 10, as shown in FIG. 2B. As a further alternative, a refractive layer 200 is formed using a coating method on the first surface 1001 of the light guide plate 100, and then a reflective layer 300 is formed using a coating method on the refractive layer 200, as shown in FIG. 2A. In addition, the decorative layer can be formed on the reflective layer 300 by a coating method. However, the present disclosure is not limited thereto.

In another aspect of the present disclosure, as shown in FIG. 3B, FIG. 3C and FIG. 7, when the refractive layer 400 is disposed on the second surface 1002 of the light guide plate 100 in Step (A), the method further comprises a step: forming a second adhesive layer 20, wherein the second adhesive layer 20 is sandwiched between the first diffusion layer 41 and the refractive layer 400, or between the refractive layer 400 and the light guide plate 100, and a refractive index of the second adhesive layer 20 is greater than the refractive index of the refractive layer 400. Herein, the material and the property of the second adhesive layer 20 are illustrated before, and are not repeated again.

More specifically, as shown in FIG. 3A through FIG. 3C and FIG. 7, in Step (A), to place the refractive layer 400 between the light guide plate 100 and the set of optical films (for example, the first diffusion layer 41), the refractive layer 400 can be disposed on the second surface 1002 of the light guide plate 100 based on the following aspects. The refractive layer 400 is adhesive itself, and directly adheres to the light guide plate 100 and the set of optical films (for example, the first diffusion layer 41) respectively, as shown in FIG. 3A. Alternatively, a refractive layer 400 is formed using a coating method on the second surface 1002 of the light guide plate 100, the refractive layer 400 is bound tightly to the light guide plate 100, the refractive layer 400 is adhered to the first diffusion layer 41 of the set of optical films by a second adhesive layer 20, and the second adhesive layer 20 is sandwiched between the first diffusion layer 41 and the refractive layer 400, as shown in FIG. 3B. As another alternative, a refractive layer 400 is formed using a coating method on the set of optical films (for example, the first diffusion layer 41), the refractive layer 400 is bound tightly to the first diffusion layer 41, the refractive layer 400 is adhered to the light guide plate 100 by a second adhesive layer 20, and the second adhesive layer 20 is sandwiched between the refractive layer 400 and the light guide plate 100, as shown in FIG. 3C. As a further alternative, a refractive layer 400 is formed on the second surface 1002 of the light guide plate 100 by a coating method, and a diffusion layer 41 of the set of the optical film is formed on the refractive layer 400 by a coating method, as shown in FIG. 3A. However, the present disclosure is not limited thereto.

In the method for manufacturing the display device according to one embodiment of the present disclosure, the backlight module may further comprise other components, which includes and are not limited to: a heat sink. These components may be assembled into the frame in Step (C). A system board and other additional components may be provided as needed after Step (D). Since there is no backplane used in the present disclosure, the system board and other additional components as described above may be installed through the frame. Moreover, a front frame may be provided on the display panel as needed. The present disclosure is not limited thereto.

The aforementioned frame may be implemented in various aspects. Examples thereof include an integrated plastic frame, an assembled frame, an adhesive reflective layer, a coating layer with reflective property, a decorative tape, or a decorative coating. To achieve better structural strength of display device, particularly for structural strength of the frame, the frame is a plastic frame. For the purpose of flexibility or light weight, the frame can be prepared by flexible materials. However, the present disclosure puts no limitation to the aspects of the frame, and different aspects may be used according to practical needs.

FIG. 8A through FIG. 8D depict the structures of light sources used in display devices according to different exemplificative embodiments of the present disclosure. The specific example of the light source is a light-emitting diode (LED).

As shown in FIG. 8A, the light source 5 comprises: a base 51; a light emitting chip 52 disposed on the base 51; and a phosphor layer 53 disposed on the base 51 and the light emitting chip 52. The light source 5 shown in FIG. 8A can emit light with circular light type. For example, the light source 5 can emit light with a light type having a full width at half maximum (FWHM) around 60 degree. In the present embodiment, the light type of the light source 5 can be measured by a display color analyzer (for example, CA-210 provided by KONICA MINOLTA), a spectrometer (for example, USB 2000), or a Fourier optics viewing angle measurement system to obtain FWHM thereof.

As shown in FIG. 8B through FIG. 8D, the light source 5 may further comprise: a light adjusting unit 54 disposed on the phosphor layer 53, wherein the light adjusting unit 54 may have plural stripe protrusions (including a first stripe protrusion 541 and a second stripe protrusion 542). When the light source 5 comprises the stripe protrusions (including the first stripe protrusion 541 and the second stripe protrusion 542), the light type of the light emitting from the light source 5 can be an ellipse-like light type, wherein the FWHM thereof at the Z direction is less than 60 degree. In the present disclosure, the Z direction can be a direction perpendicular to the luminous surface of the light guide plate (for example, a direction is perpendicular to the luminous surface of the light guide plate, and the luminous surface is near to the light source of the light guide plate), a direction parallel to an incident surface, or a direction parallel to a center viewing angle of an user. The material of the stripe protrusions is not particularly limited, and can be a transparent heat-resistant material such as plastics, or resins. In the present disclosure, the stripe protrusions can be strip prisms; but the present disclosure is not limited thereto.

The shapes of the stripe protrusions (including the first stripe protrusion 541 and the second stripe protrusion 542) are not particularly limited, as long as the purpose that the FWHM of the light emitting from the light source 5 at the Z direction is less than 60 degree can be achieved. For example, as shown in FIG. 8B and FIG. 8C, cross sections of the stripe protrusions (including the first stripe protrusion 541 and the second stripe protrusion 542) may be triangle shape. As shown in FIG. 8D, cross sections of the stripe protrusions (including a first stripe protrusion 541 and a second stripe protrusion 542) can be arc shapes. However, the present disclosure is not limited thereto.

In addition, the arrangement of the stripe protrusions (including the first stripe protrusion 541 and the second stripe protrusion 542) can be continuous or discontinuous, as long as the purpose that the FWHM of the light emitting from the light source 5 at the Z direction is less than 60 degree can be achieved. For example, as shown in FIG. 8B and FIG. 8C, when the stripe protrusions are continuously arranged, the first stripe protrusion 541 connects to the second stripe protrusion 542. As shown in FIG. 8D, when the stripe protrusions are not continuously arranged, the first stripe protrusion 541 is adjacent to the second stripe protrusion 542, the first stripe protrusion 541 has a first boundary 541a, the second stripe protrusion 542 has a second boundary 542a, the first boundary 541a is adjacent to the second boundary 542a, and a predetermined distance between the first boundary 541 and second boundary 542a may be designed. However, the present disclosure is not limited thereto, and the aforementioned aspects can be used in combination according to actual applications.

Furthermore, as shown in FIG. 8C and FIG. 8D, the light source 5 may further comprise: an air layer 55 disposed between the light adjusting unit 54 and the phosphor layer 53.

Figure 8E:
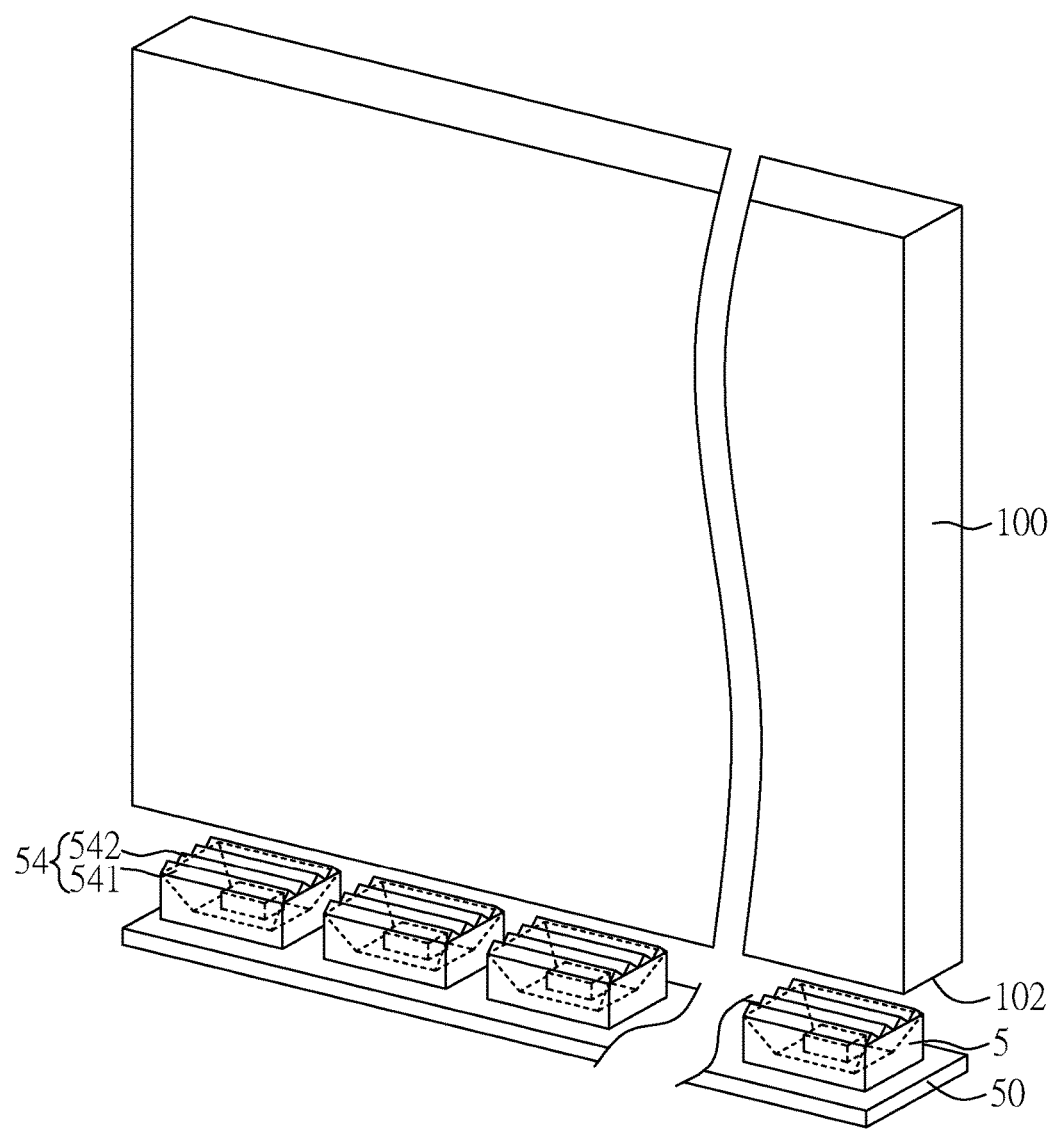
FIG. 8E is a perspective view showing the assembling of a light source and a backlight module according to one exemplificative embodiment of the present disclosure.

As shown in FIG. 8E, the display device of the present disclosure may further comprise plural light sources 5 disposed besides an incident surface 102 of the light guide plate 100. The structure of the light sources 5 can be shown in FIG. 8B through FIG. 8D, wherein extension directions of the stripe protrusions (including the first stripe protrusion 541 and the second stripe protrusion 542) are substantially identical to an arrangement direction of the light sources 5.

Figure 9:
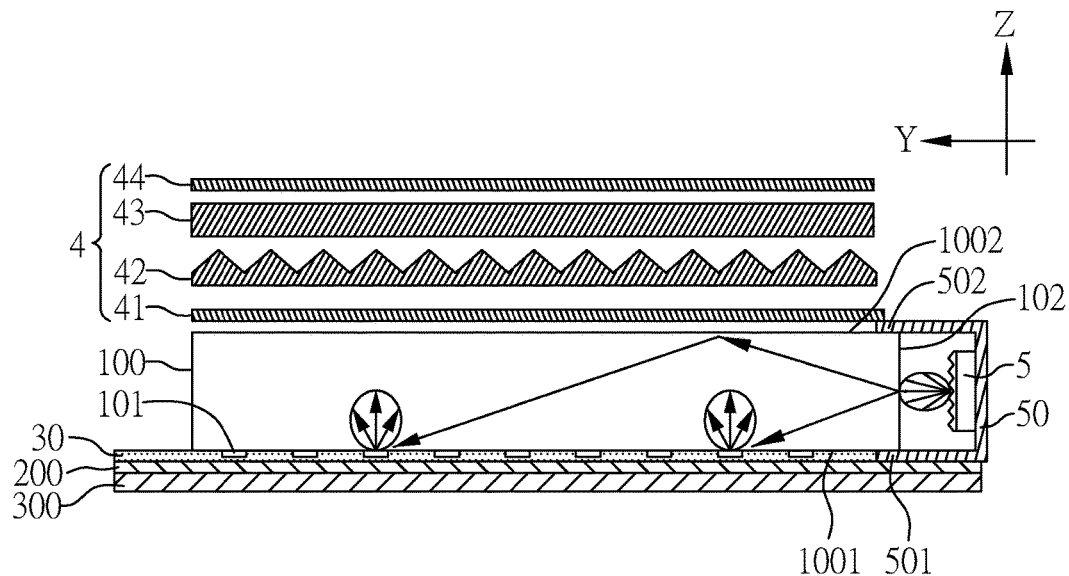
FIG. 9 through FIG. 13 depict the structures of backlight modules used in display devices according to different exemplificative embodiments of the present disclosure.

FIG. 9 depicts the profile diagram of a backlight module used in a display device according to one exemplificative embodiment of the present disclosure. The backlight module of the present embodiment further comprises: a light source 5 disposed beside an incident surface 102 of the light guide plate 100, wherein the light source 5 can be any one of the light sources shown in FIG. 8B through FIG. 8D. In the display device equipped with the light source shown in FIG. 8A, bright lines are occurred at the incident sides (front light), which leads to lose luminance about 30% to 50%. In the present embodiment, when the light source shown in FIG. 8B through FIG. 8D is used, the FWFM of the light emitting from the light source 5 at the Z direction is less than 60 degree; therefore, the problem of the bright lines at the incident sides can be improved, and the luminance lost can be reduced.

In addition, as shown in FIG. 9, for the backlight module of the present embodiment, the light source 5 is disposed in a reflective encasement 50, the reflective encasement 50 is disposed to be adjacent to the incident surface 102 of the light guide plate 100, and the reflective encasement 50 may have a rectangular shape. The reflective encasement 50 may have a first end 501 and a second end 502, and the first end 501 and the second end 502 correspond to the first surface 1001 and the second surface 1002 of the light guide plate 100. For example, the first end 501 and the second end 502 are respectively disposed on the first surface 1001 and the second surface 1002 of the light guide plate 100. In the present embodiment, the light guide plate 100 may be partially embedded in the reflective encasement 50. In another embodiment, a part of the encasement 50 can be fixed by an adhesive gel 30, but the present disclosure is not limited thereto.

Figure 10:
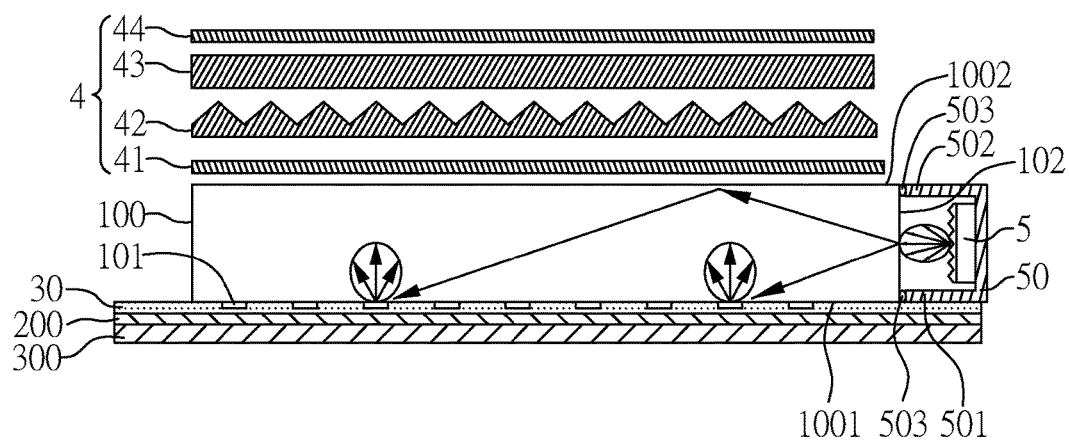

However, in the present disclosure, the light guide plate 100 may be assembled on the reflective encasement 50 by another manner. For example, as shown in FIG. 10, the first end 501 and the second end 502 of the reflective encasement 50 are respectively assembled on the incident surface 102 of the light guide plate 100 by a fixed adhesive 503. In the present embodiment, the light guide plate 100 is assembled on the reflective encasement 50 by an adhesive method. In another embodiment, a part of the encasement 50 can be fixed by an adhesive gel 30, but the present disclosure is not limited thereto.

Figure 11:
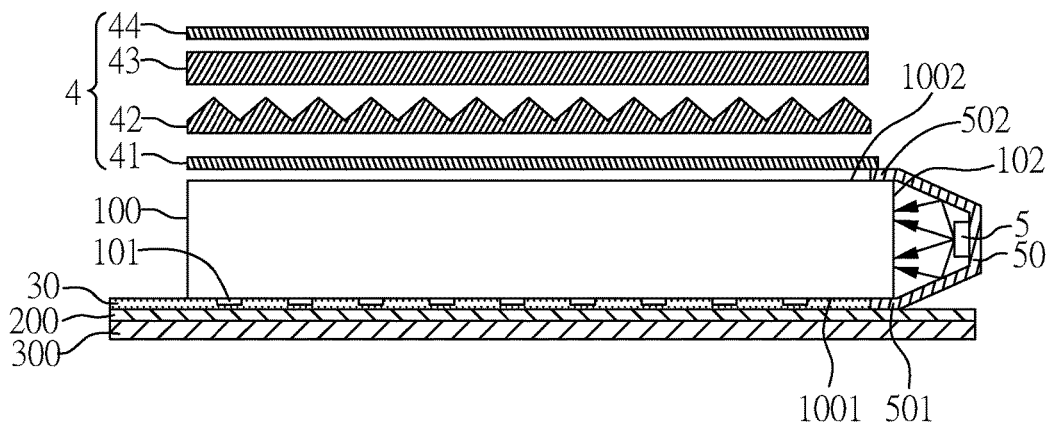

FIG. 11 depicts the structure of a backlight module used in a display device according to another exemplificative embodiment of the present disclosure. The backlight module of the present embodiment further comprises: a light source 5 and a reflective encasement 50, wherein the light source 5 is disposed in the reflective encasement 50, the light source 5 and the reflective encasement 50 are disposed beside an incident surface 102 of the light guide plate 100, a shape of reflective encasement 50 assembled with the light guide plate 100 may be an arc shape, a trapezoid shape or a polygon shape, and the polygon shape may have at least five sides. For example, as shown in FIG. 11, the reflective encasement 50 assembled with the light guide plate 100 has a trapezoid shape. The display device is equipped with the light source shown in FIG. 8A. When the shape of the reflective encasement 50 is adjusted, the light type of the light emitting from the light source 5 can be changed. The incident angle of the light emitting from the light source 5 is reduced, and the FWFM of the light emitting from the light source 5 at the Z direction is less than 60 degree; therefore, the problem of the bright lines at the incident sides can be improved, and the luminance lost can be reduced.

Figure 12:
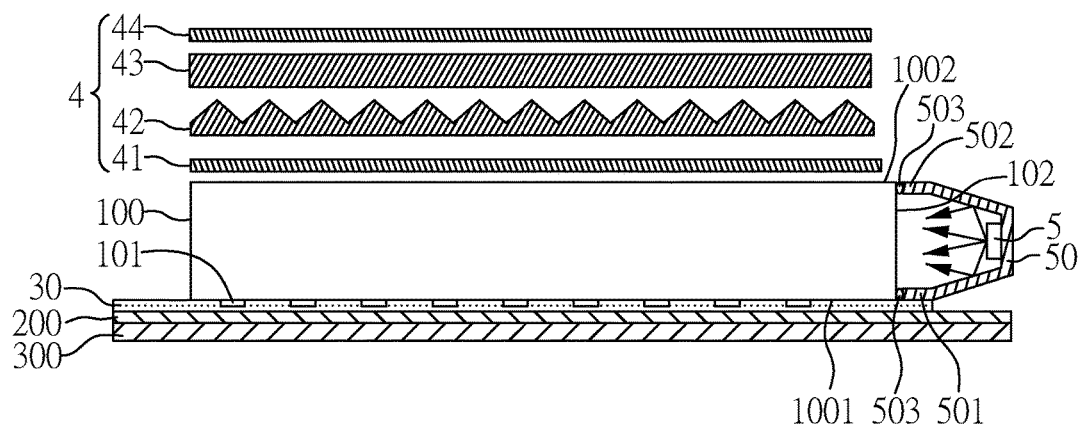

As shown in FIG. 11, in the present embodiment, the light guide plate 100 may be, partially embedded in the reflective encasement 50. The method for embedding the light guide plate 100 in the reflective encasement 50 is similar to that shown in FIG. 9, and not repeated again. Similarly, as shown in FIG. 12, in the present embodiment, the light guide plate 100 is assembled on the reflective encasement 50 by a fixed adhesive 503. The method for adhering the light guide plate 100 on the reflective encasement is similar to that shown in FIG. 10, and not repeated again.

In the embodiments shown in FIG. 9 through FIG. 12, the reflective encasement 50 can be a rigid reflective encasement or a flexible reflective encasement. For example, when the reflective encasement 50 is a rigid reflective encasement, it can be prepared by heat sink materials. When the reflective encasement 50 is a flexible reflective encasement, it can be prepared by the material for forming the reflective layer 2.

Figure 13:
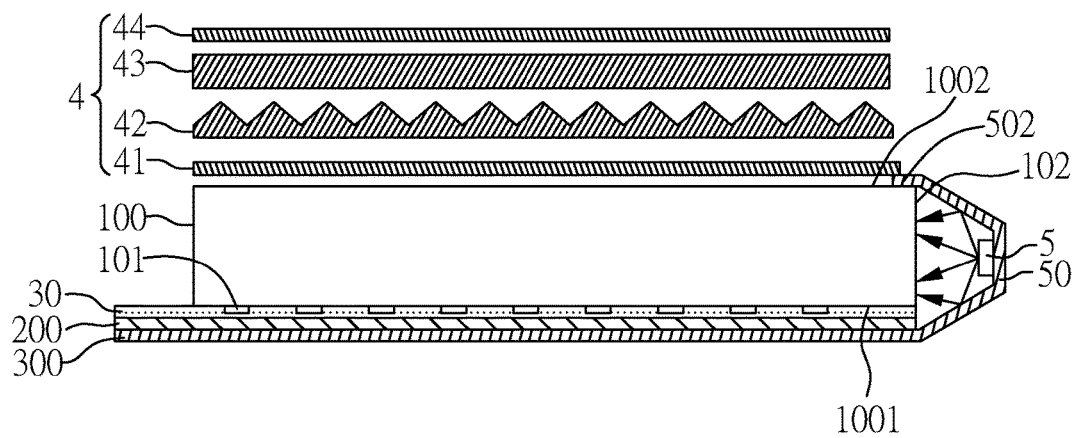

FIG. 13 depicts the structure of a backlight module used in a display device according to another exemplificative embodiment of the present disclosure. When the material of the reflective encasement 50 is identical to the material of the reflective layer 2, the reflective layer 2 and the reflective encasement 50 can be integrally formed. In addition, in the backlight modules shown in FIG. 9 through FIG. 12, the reflective layer 2 and the reflective encasement 50 can also be integrally formed. For example, the first end 501 of the reflective encasement 50 can be directly connected to the reflective layer 2 to obtain the purpose of integration; and the second end 502 of the reflective encasement 50 is fixed to the light guide plate 100. The light guide plate 100 shown in the embodiment of FIG. 13 is, for example, embedded in the reflective encasement 50, and the embedded manner thereof is similar to that shown in FIG. 9 and is not repeated again. In other embodiment, the second end 502 of the reflective encasement 50 can be fixed on the light guide plate 100 by a fixed adhesive 503. However, the present disclosure is not limited thereto, and the aforesaid aspects can be randomly combined according to actual applications.

Figure 14:
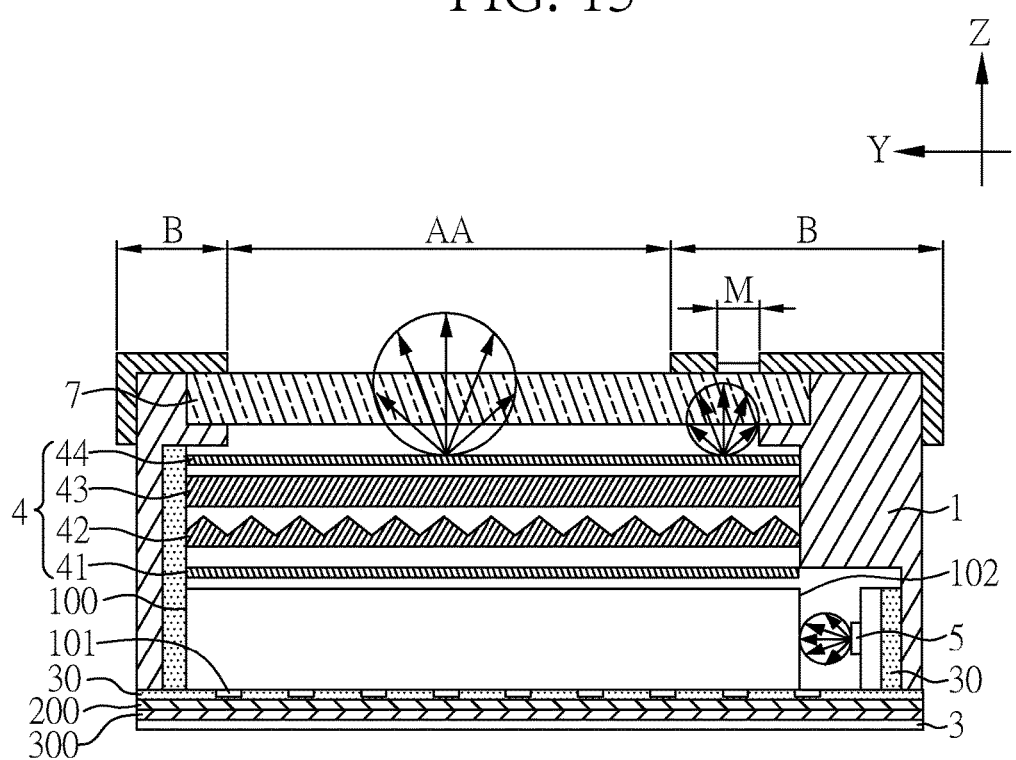
FIG. 14 is a cross-sectional view of a display device according to another exemplificative embodiment of the present disclosure.

FIG. 14 is a cross-sectional view of a display device according to another exemplificative embodiment of the present disclosure. The display device of the present embodiment further comprises: a display region AA and a non-display region B, the display region AA is adjacent to the non-display region B, and the non-display region B comprises a sign region M. The sign region M can be a hollow portion of a front frame, or a portion of a front frame equipped with a transparent or colored material, and visible light can be penetrated. In the present embodiment, the sign region M may be used for labeling logos, marks or other signs. In addition, the display device of the present embodiment may further comprise: a light source 5 disposed beside an incident surface 102 of the light guide plate 100, and the light source 5 can be fixed on a frame 1 by adhesive gel 30. In the present embodiment, the light source 5 is disposed in a rectangular space formed by parts of the frame 1, wherein, a portion of the frame 1 for forming the rectangular space is provided with reflective characteristics (which can be accomplished by coating a reflective material or disposing additional reflective material on the inner wall of the portion of the frame 1) and can be served as a reflective encasement 50. In the present embodiment, by the disposition of the sign region M of the non-display region B, parts of the light emitting from the light sources 5 can penetrate through the sign region M to glow a marked pattern. Hence, compared to the display device that additional light source is required in the sign region for glowing a marked pattern, the disposition of the additional light source can be removed in the display device of the present embodiment. The display device shown in FIG. 14 can be used with any fully-adhered structures shown in the aforementioned aspects or embodiments alone or in combination. The display device shown in FIG. 14 may also use any light source with different light types. In addition, the light guide plate with different screen dot design, mechanical structures, optical films with different properties, or reflective layers with different designed can also be used in the present embodiment, to achieve the purpose that parts of the light emitting from the light sources 5 can penetrate through the sign region M to glow a marked pattern. However, the present disclosure is not limited thereto.

The display device manufacturing according to the foregoing embodiments of the present disclosure may be used with a touch panel to form a touch display device. In addition, the display device or touch display device manufacturing according to the foregoing embodiments of the present disclosure may be applied to any electronic devices, such as displays, mobile phones, laptop computers, video cameras, still cameras, mobile navigators, TV sets, to just name a few without limitation.

In one embodiment of the present disclosure, an adhesive method is putted forward in order to prevent warping or waving during assembling processes of the films, and/or reduce the risk of ambient water invasion or foreign material defects, for example light guide plate is adhered to the reflective layer, and/or the light guide plate is adhered the set of optical films. Additionally, the display device can be further thinned by using the adhered combination of the decorative film and the reflective layer instead of a backplane, or forming the films through coating.

Although the present disclosure has been explained in relation to its embodiment, it is to be understood that many other possible modifications and variations can be made without departing from the spirit and scope of the disclosure as hereinafter claimed.

What is claimed is:

1. A display device, comprising:
a decorative film;
a backlight module, comprising:
a reflective layer, disposed on the decorative film;
a light guide plate, disposed on the reflective layer, wherein the light guide plate has a first surface and a second surface opposite to the first surface, and the first surface faces the reflective layer;
a set of optical films, comprising a first diffusion layer, wherein the first diffusion layer is disposed over the second surface of the light guide plate; and
a refractive layer, disposed on the first surface or the second surface of the light guide plate, wherein the refractive layer has a refractive index between 1.15 and 1.45; and
a display panel, disposed on one side of the set of optical films far away from the light guide plate.

2. The display device of claim 1, wherein the refractive layer is disposed on the first surface of the light guide plate, and the display device further comprises a first adhesive layer; wherein the first adhesive layer is sandwiched between the refractive layer and the light guide plate, or between the refractive layer and the reflective layer, and a refractive index of the first adhesive layer is greater than the refractive index of the refractive layer.

3. The display device of claim 1, wherein the refractive layer is disposed on the second surface of the light guide plate, and the display device further comprises a second adhesive layer; wherein the second adhesive layer is sandwiched between the first diffusion layer and the refractive layer, or between the refractive layer and the light guide plate, and a refractive index of the second adhesive layer is greater than the refractive index of the refractive layer.

4. The display device of claim 1, wherein the refractive layer has a thickness between 0.01 micron ($\mu$m) and 200 micron ($\mu$m).

5. The display device of claim 1, wherein the decorative film has a thickness between 1 micron ($\mu$m) and 500 micron ($\mu$m).

6. The display device of claim 1, further comprising a light source and a reflective encasement, wherein the light source is disposed in the reflective encasement, and the reflective encasement is disposed beside an incident surface of the light guide plate.

7. The display device of claim 6, wherein the reflective encasement has a first end and a second end, and the first end and the second end correspond to the first surface and the second surface of the light guide plate.

8. The display device of claim 6, further comprising a display region and a non-display region, wherein the display region is adjacent to the non-display region, the non-display region comprises a sign region, and parts of lights emitting from the light source irradiates into the sign region.

9. The display device of claim 6, wherein the light source comprises:
a light emitting chip;
a phosphor layer disposed on the light emitting chip; and
a light adjusting unit disposed on the phosphor layer, wherein the light adjusting unit has plural stripe protrusions.

10. The display device of claim 9, further comprising plural light sources, wherein an extension direction of the stripe protrusions is substantially identical to an arrangement direction of the light sources.

11. A display device, comprising:
a decorative film;
a backlight module, comprising:
a reflective layer, disposed on the decorative film;
a light guide plate, disposed on the reflective layer, wherein the light guide plate has a first surface and a second surface opposite to the first surface, and the first surface faces the reflective layer;
a set of optical films, comprising a first diffusion layer, wherein the first diffusion layer is disposed over the second surface of the light guide plate; and
a refractive layer, directly contacting the first surface or the second surface of the light guide plate, wherein the refractive layer has a refractive index between 1.15 and 1.45; and
a display panel, disposed on one side of the set of optical films far away from the light guide plate.

12. The display device of claim 11, wherein the refractive layer is disposed on the second surface of the light guide plate, and the display device further comprises a second adhesive layer; wherein the second adhesive layer is sandwiched between the first diffusion layer and the refractive layer, or between the refractive layer and the light guide plate, and a refractive index of the second adhesive layer is greater than the refractive index of the refractive layer.

13. The display device of claim 11, wherein the first diffusion layer has a thickness between 1 micron ($\mu$m) and 200 micron ($\mu$m).

14. The display device of claim 11, wherein the reflective layer has a thickness between 1 micron ($\mu$m) and 500 micron ($\mu$m).

15. A method for manufacturing a display device, comprising the following steps:
(A) adhering a decorative film and a reflective layer, and adhering a light guide plate and the reflective layer, wherein the light guide plate has a first surface and a second surface opposite to the first surface, the first surface faces the reflective layer, a refractive layer is disposed on the first surface or the second surface, and the refractive layer has a refractive index between 1.15 and 1.45;
(B) disposing a light source and a printed circuit board beside the light guide plate;

(C) adhering a set of optical films and the light guide plate, wherein the set of optical films comprises a first diffusion layer, and the first diffusion layer is disposed over the second surface of the light guide plate; and (D) assembling the reflective layer, the light guide plate, the refractive layer and the set of optical films, and disposing a display panel on one side of the set of optical films far away from the light guide plate, to form a display device.

16. The method of claim 15, wherein in Step (A), the refractive layer is formed on the first surface or the second surface of the light guide plate by coating.

17. The method of claim 15, wherein in Step (A) or Step (C), the reflective layer, the first diffusion layer or a combination thereof is formed by coating.

18. The method of claim 15, wherein in Step (A), the decorative layer is formed on the reflective layer by coating.

19. The method of claim 15, wherein the refractive layer is disposed on the first surface of the light guide plate in Step (A), the method further comprises a step: forming a first adhesive layer, wherein the first adhesive layer is sandwiched between the refractive layer and the light guide plate, or between the refractive layer and the reflective layer, and a refractive index of the first adhesive layer is greater than the refractive index of the refractive layer.

20. The method of claim 15, wherein the refractive layer is disposed on the second surface of the light guide plate in Step (A), the method further comprises a step: forming a second adhesive layer, wherein the second adhesive layer is sandwiched between the first diffusion layer and the refractive layer, or between the refractive layer and the light guide plate, and a refractive index of the second adhesive layer is greater than the refractive index of the refractive layer.

* * * * *